(12) United States Patent
Salter et al.

(10) Patent No.: US 12,118,793 B2
(45) Date of Patent: Oct. 15, 2024

(54) SYSTEMS AND METHODS FOR PROVIDING A VEHICLE-AND-DRONE-BASED SECURITY SERVICE

(71) Applicant: Ford Global Technologies, LLC, Dearborn, MI (US)

(72) Inventors: Stuart C. Salter, White Lake, MI (US); Brendan Diamond, Grosse Pointe, MI (US); John Robert Van Wiemeersch, Novi, MI (US); Tarik Safir, Chesterfield (GB); Sam Harris, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 373 days.

(21) Appl. No.: 17/659,851

(22) Filed: Apr. 20, 2022

(65) Prior Publication Data

US 2023/0343101 A1 Oct. 26, 2023

(51) Int. Cl.
*G06V 20/52* (2022.01)
*B60L 58/12* (2019.01)
(Continued)

(52) U.S. Cl.
CPC ............. *G06V 20/52* (2022.01); *B60L 58/12* (2019.02); *B64C 39/024* (2013.01); *G06V 20/17* (2022.01);
(Continued)

(58) Field of Classification Search
CPC ........ G06V 20/52; G06V 20/17; G06V 20/58; B60L 58/12; B60L 58/13; B60L 2200/10;
(Continued)

(56) References Cited

U.S. PATENT DOCUMENTS 10,248,120 B1 * 4/2019 Siegel .................. G05D 1/0223
10,867,398 B2 * 12/2020 Leduc .................. G06F 3/0325
(Continued)

FOREIGN PATENT DOCUMENTS

WO    WO-2016132295 A1 * 8/2016 ........... B64C 39/024

OTHER PUBLICATIONS

Geumhwan Cho et al., Sentinel: A Secure and Efficient Authentication Framework for Unmanned Aerial Vehicles, Applied Science, vol. 10, Issue 9, Apr. 30, 2020.
(Continued)

*Primary Examiner* — Mahendra R Patel
(74) *Attorney, Agent, or Firm* — Emily Drake; Eversheds Sutherland (US) LLP

(57) ABSTRACT

The disclosure generally pertains to systems and methods for providing a vehicle-and-drone-based security service. In an example method, a first area of interest and a second area of interest associated with a structure may be determined. The first area of interest may then be determined to be monitored at the vehicle. The second area of interest may also be determined to be monitored at a drone associated with the vehicle. A route may be identified for the drone to travel along, where the route is configured for the drone to (Continued)

monitor the second area of interest. The drone may then be launched via the vehicle to travel along the route to monitor the second area of interest.

17 Claims, 8 Drawing Sheets

(51) Int. Cl.
*B64C 39/02* (2023.01)
*B64U 50/19* (2023.01)
*B64U 80/86* (2023.01)
*B64U 101/30* (2023.01)
*G06V 20/17* (2022.01)
*G06V 20/58* (2022.01)
*G08G 5/00* (2006.01)

(52) U.S. Cl.
CPC .......... G06V 20/58 (2022.01); G08G 5/0034 (2013.01); *B64U 50/19* (2023.01); *B64U 80/86* (2023.01); *B64U 2101/30* (2023.01)

(58) Field of Classification Search
CPC . B60L 2260/54; B64C 39/024; G08G 5/0034; B64U 50/19; B64U 80/86; B64U 2101/30; B64U 2101/00; B64U 2201/10; B64U 50/37; B64U 80/25; B64U 2201/20; H04B 7/18506; H04L 67/12; H04N 7/181
USPC ........................................................ 382/103
See application file for complete search history.

(56) References Cited

U.S. PATENT DOCUMENTS

| | | | |
|---|---|---|---|
| 11,558,743 B2 * | 1/2023 | Fox | H04L 9/3213 |
| 11,637,716 B1 * | 4/2023 | Kerzner | H04L 12/2827 |
| | | | 700/245 |
| 11,701,978 B2 * | 7/2023 | Maurer | G05D 1/12 |
| | | | 701/3 |
| 2016/0086391 A1 * | 3/2016 | Ricci | G07C 5/08 |
| | | | 701/29.3 |
| 2016/0116914 A1 * | 4/2016 | Mucci | G05D 1/0088 |
| | | | 701/2 |
| 2018/0035606 A1 * | 2/2018 | Burdoucci | A01D 34/008 |
| 2018/0217591 A1 * | 8/2018 | Wiggins | G08B 13/1965 |
| 2018/0233053 A1 * | 8/2018 | Blomberg | G08G 5/0082 |
| 2018/0234164 A1 * | 8/2018 | Hardy | G06V 20/17 |
| 2018/0364713 A1 * | 12/2018 | Foster, II | G08G 5/0034 |
| 2019/0047462 A1 * | 2/2019 | Vijayaraghavan | G05D 1/0088 |
| 2020/0066142 A1 * | 2/2020 | Fowe | G06V 20/182 |
| 2020/0312161 A1 * | 10/2020 | Dorum | B64C 39/024 |
| 2021/0146977 A1 * | 5/2021 | Rajan Kesavelu Shekar | B61L 23/041 |
| 2022/0044574 A1 * | 2/2022 | Chow | G08G 5/0034 |

OTHER PUBLICATIONS

Menglan Hu et al., On the joint design of routing and scheduling for Vehicle-Assisted Multi-UAV inspection, Elsevier, Future Generation Computer Systems, vol. 94, May 2019, pp. 214-223.

* cited by examiner

SYSTEMS AND METHODS FOR PROVIDING A VEHICLE-AND-DRONE-BASED SECURITY SERVICE

BACKGROUND

Property owners may desire for various locations throughout their property to be monitored. However, in some instances, it may not be feasible for some of those locations to be monitored by a vehicle. For example, a location may not be close to a street, or a location may not be visible from any vehicle-accessible routes. Further, property owners may desire to pool their resources for security services with other property owners in order to reduce energy consumption while providing security services to the participating property owners.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
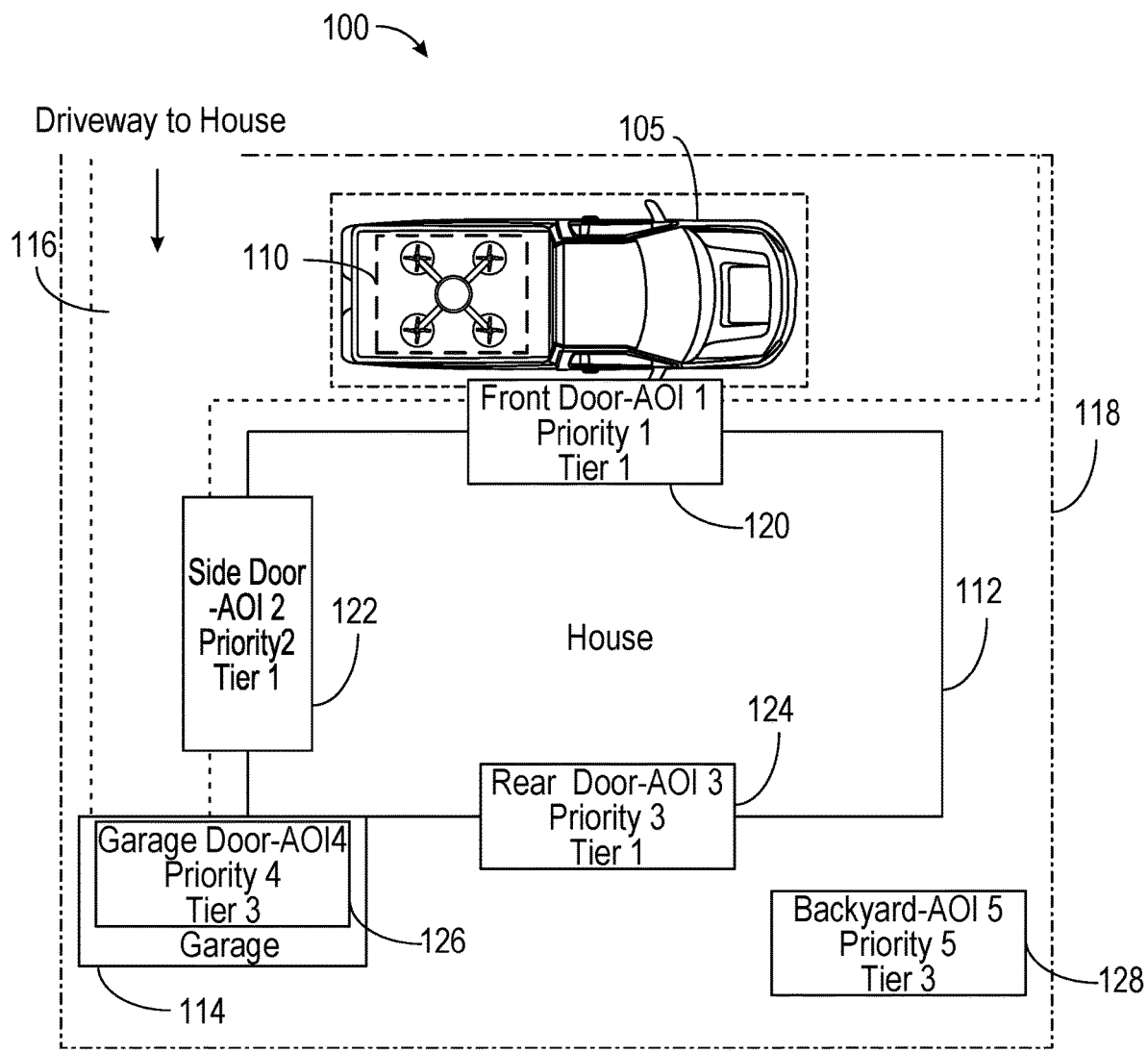
FIG. 1 illustrates an example implementation of a vehicle-and-drone-based security service in accordance with an embodiment of the disclosure.

In terms of a general overview, certain embodiments described in this disclosure are directed to systems and methods for providing a vehicle-and-drone-based security service. In an example method, a first area of interest and a second area of interest associated with a structure may be determined. The first area of interest may then be determined to be monitored by the vehicle. The second area of interest may also be determined to be monitored by a drone associated with the vehicle. A route may be identified for the drone to travel along, where the route is configured for the drone to monitor the second area of interest. The drone may then be launched via the vehicle to travel along the route to monitor the second area of interest.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component.

Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "vehicle owner" may be used interchangeably with the word "user" and the word "customer." Either word as used herein refers to any individual that is utilizing the rendezvous service. The word "device" may be any of various devices, such as, for example, a user device such as a smartphone or a tablet, a smart vehicle, a smart vehicle fob, and a computer." The word "sensor" may be any of various sensors that can be found in a vehicle, such as cameras, radar sensors, Lidar sensors, and sound sensors.

It must also be understood that words such as "implementation," "scenario," "case," and "situation" as used herein are an abbreviated version of the phrase "in an example ("implementation," "scenario," "case," "approach," and "situation") in accordance with the disclosure." Furthermore, the word "example" as used herein is intended to be non-exclusionary and non-limiting in nature.

FIG. 1 illustrates an example vehicle-and-drone-based security service 100 in accordance with an embodiment of the disclosure. The vehicle-and-drone-based security service 100 may be carried out by a vehicle 105, which may be any of various types of vehicles such as, for example, a gasoline powered vehicle, an electric vehicle, a hybrid electric vehicle, an autonomous vehicle, a sedan, a van, a minivan, a sports utility vehicle, a truck, a station wagon, or a bus. At least one drone 110 may be associated with the vehicle 105. For example, the at least one drone 110 may be mounted to the vehicle 105. The vehicle 105 may further include various types of sensors and detectors configured to provide various functionalities. For example, the vehicle 105 may include radar sensors, infrared sensors, ultrasonic sensors, capacitive sensors, a variety of cameras in various locations throughout the vehicle 105.

In some embodiments, the vehicle 105 may further include a vehicle computer having a processor, a communications module, an image and/or video feed processing module, and a memory. The processor may carry out various operations by executing computer-readable instructions stored in the memory. The memory, which is one example of a non-transitory computer-readable medium, may be used to store a database for storing data and an operating system (OS). In some embodiments, the vehicle computer may be communicatively coupled to other components of the vehicle 105 via wired and/or wireless connections. More particularly, the vehicle computer may be communicatively coupled to the vehicle 105 via a vehicle bus that uses a controller area network (CAN) bus protocol, a Media Oriented Systems Transport (MOST) bus protocol, and/or a CAN flexible data (CAN-FD) bus protocol. In another embodiment, the communications may be provided via wireless technologies such as Bluetooth®, Ultra-Wideband (UWB), cellular, Wi-Fi, ZigBee®, or near-field communications (NFC).

In some embodiments, the vehicle computer may be configured to communicate via a network with devices located outside the vehicle 105, such as, for example, a computer (a server computer, a cloud computer, etc.) and/or a cloud storage device. The network may include any one, or a combination of networks, such as, for example, a local area network (LAN), a wide area network (WAN), a telephone network, a cellular network, a cable network, a wireless network, and/or private/public networks such as the Internet. The network 150 may support any of various communications technologies, such as, for example, TCP/IP, Bluetooth®, near-field communication (NFC), Wi-Fi, Wi-Fi Direct, Ultra-Wideband (UWB), cellular, machine-to-machine communication, and/or man-to-machine communication. For example, the vehicle 105 may be configured to communicate with the at least one drone 110 via wired and/or wireless communications using any of these networks. This enables the vehicle 105 to send instructions to the at least one drone 110, and also enables the at least one drone 110 to transmit images and/or video feed obtained by the at least one drone 110 to the vehicle 105.

In some embodiments, as depicted in FIG. 1, the vehicle 105 may be parked at an owner's property. The property owner may own the vehicle 105. The property may include a house 112, a garage 114, a driveway 116, and other structures not depicted in FIG. 1. In some embodiments, the property may be enclosed by a fence 118. In some embodiments, the vehicle 105 may be parked in the driveway 116, as depicted in FIG. 1. In other embodiments, the vehicle 105 may be parked in another location, such as along a street next to the property. In some instances, the property owner may register the vehicle 105 and the property as participating in the vehicle-and-drone-based security service 100.

In some embodiments, at least one area of interest associated with the property may be determined. In some embodiments, the at least one area of interest may be selected by the property owner for monitoring. The property owner may be further able to designate a desired tier of protection and a relative priority associated with the at least one area of interest. Desired tiers of protection may include Tier I, Tier II, Tier III, and so on. For example, as depicted in FIG. 1, the property owner may designate a front door 120 of the house 112 as a first area of interest. The front door 120 may be designated as having a first priority and Tier I protection needs. The property owner may further designate a side door 122 of the house 112 as a second area of interest having a second priority and Tier I protection needs. The property owner may then designate a rear door 124 of the house 112 as a third area of interest having a third priority and Tier I protection needs. The property owner may also designate a garage door 126 of the garage 114 as a fourth area of interest having a fourth priority and Tier III protection. The property owner may finally designate a backyard 128 as a fifth area of interest having a fifth priority and Tier III protection. In some embodiments, the vehicle-and-drone-based security service 100 may generate a localized map depicting the various designated areas of interest for monitoring.

Figure 2:
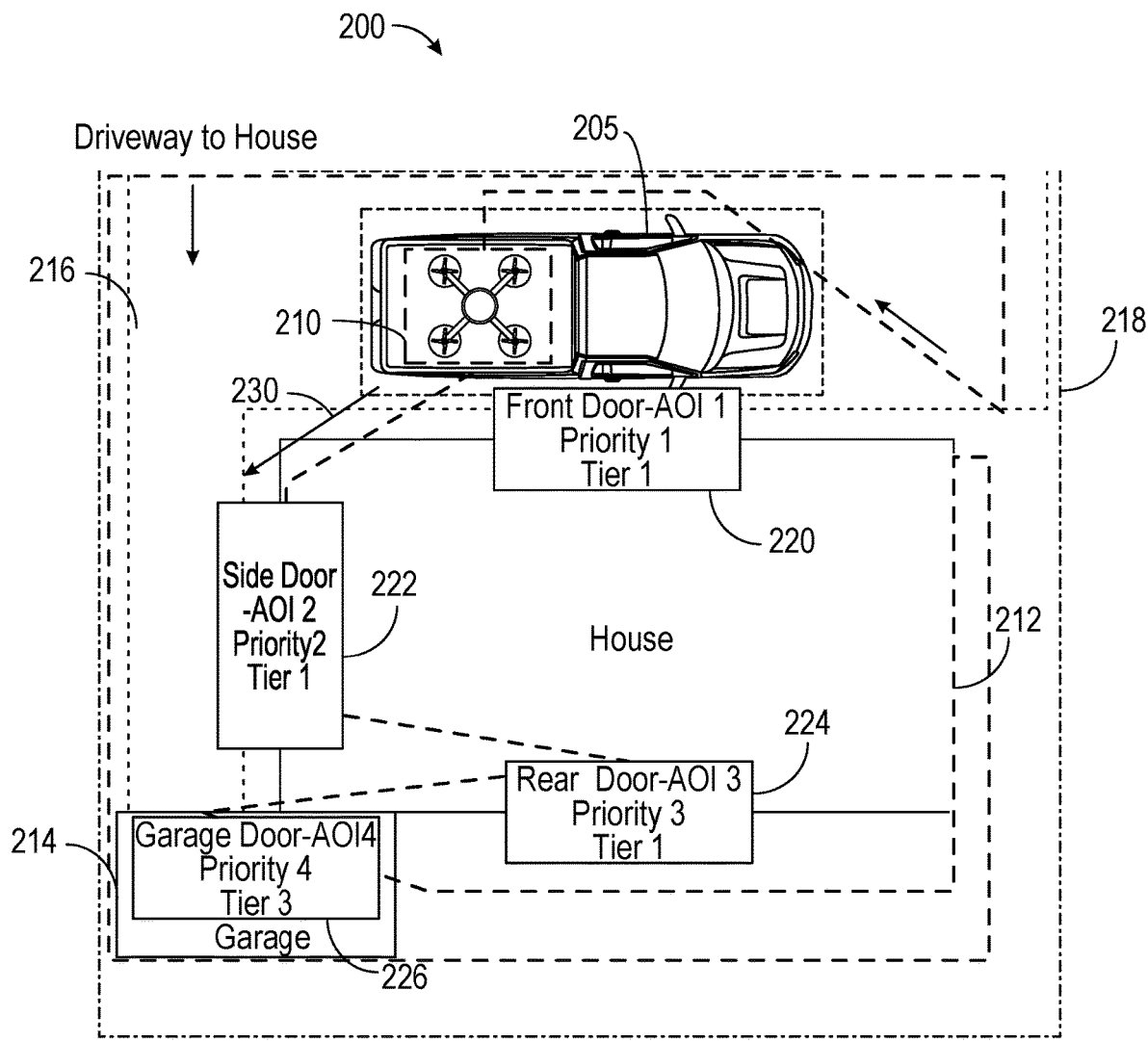
FIG. 2 illustrates an example implementation of a vehicle-and-drone-based security service in accordance with an embodiment of the disclosure.

FIG. 2 illustrates an example implementation of a vehicle-and-drone-based security service 200 in accordance with an embodiment of the disclosure. Similar to FIG. 1, a vehicle 205 may be parked in a driveway 216 on the property owner's property. At least one drone 210 may be associated with the vehicle 205. The property may include a house 212, a garage 214, the driveway 216, and other structures not depicted in FIG. 2. The property may be enclosed by a fence 218. In some embodiments, the property owner may have designated a front door 220 of the house 212 as a first area of interest, a side door 222 of the house 212 as a second area of interest, a rear door 224 of the house 212 as a third area of interest, and a garage door 226 of the garage 214 as a fourth area of interest.

In some embodiments, the vehicle-and-drone-based security service 200 may determine which of the five areas of interest should be designated for monitoring by the vehicle 205, and which of the five areas of interest should be designated for monitoring by the at least one drone 210. This designation may be made based at least in part on a variety of factors, such as a field of view of the vehicle 205, a field of view of the at least one drone 210, the ability of the vehicle 205 to move in various directions, the ability of the at least one drone 210 to move in various directions, a distance of the vehicle 205 and the at least one drone 210 from each area of interest, an amount of energy that the vehicle 205 can expend on the vehicle-and-drone-based security service 200, a battery charge level associated with the at least one drone 210, sensor capabilities associated with the vehicle 205, and sensor capabilities associated with the at least one drone 210. For example, the sensor capabilities associated with the vehicle 205 and the at least one drone 210 may refer to the vehicle's 205 ability and the at least one drone's 210 ability to meet a desired level of vision and/or threat detection associated with the designated tier of protection provided by the property owner.

In some embodiments, the vehicle 205 may be designated as primarily stationary. In such an embodiment, the vehicle 205 may be assigned to monitor areas of interest within a field of view of the vehicle 205. The remaining areas of interest may be assigned to the at least one drone 210 for monitoring. The vehicle 205 may still be configured to move if a threat is detected. In other embodiments, the vehicle 205 may not be designated as primarily stationary, and the vehicle 205 may be assigned to monitor areas of interest that may be within a field of view of the vehicle 205 as the vehicle 205 travels along a route. In instances where the vehicle 205 is an autonomous vehicle, the vehicle 205 may be configured to move along vehicle-accessible pathways in order to ensure constant communication with the at least one drone 210.

As depicted in FIG. 2, the vehicle 205 may be assigned to monitor the front door 220. The at least one drone 210 may be assigned to monitor the side door 222, the rear door 224, and the garage door 226. The vehicle-and-drone-based security service 200 may determine a route 230 for the at least one drone 210 to travel along, where the route 230 will allow the at least one drone 210 to monitor the side door 222, the rear door 224, and the garage door 226. The route 230 may involve the at least one drone 210 traveling from the vehicle 205 to the side door 222 (the second area of interest), to the rear door 224 (the third area of interest), to the garage door 226 (the fourth area of interest), along the fence 218 until an entire perimeter of the fence 218 has been monitored, and then returning to the vehicle 205 The vehicle-and-drone-based security service 200 may verify that the at least one drone 210 has sufficient battery charge to travel along this route 230. The vehicle-and-drone-based security service may further verify that the at least one drone 210 has sufficient sensor capabilities to meet the designated tiers of protection assigned to the side door 222, the rear door 224, and the garage door 226. After the route 230 has been determined, the at least one drone 210 may be launched from the vehicle 205 to travel along the route 230.

In some instances, a property owner may designate an additional area of interest after the at least one drone 210 has already been launched from the vehicle 205. For example, the at least one drone 210 may be located proximate to one of the areas of interest in order to monitor that area of interest when the vehicle-and-drone-based security service 200 receives a notification to add a fifth area of interest having a designated priority and a designated tier of protection. If the designated priority of the fifth area of interest is higher than the priority of the area of interest that the at least one drone 210 is presently monitoring, the at least one drone 210 may be instructed to proceed to the fifth area of interest and monitor it. Additionally, if the designated tier of protection of the fifth area of interest is different from the tier of protection of the area of interest that the at least one drone 210 is presently monitoring, at least one sensor setting associated with the at least one drone 210 may be changed in order to achieve the designated tier of protection when the at least one drone 210 arrives at the fifth area of interest.

Figure 3:
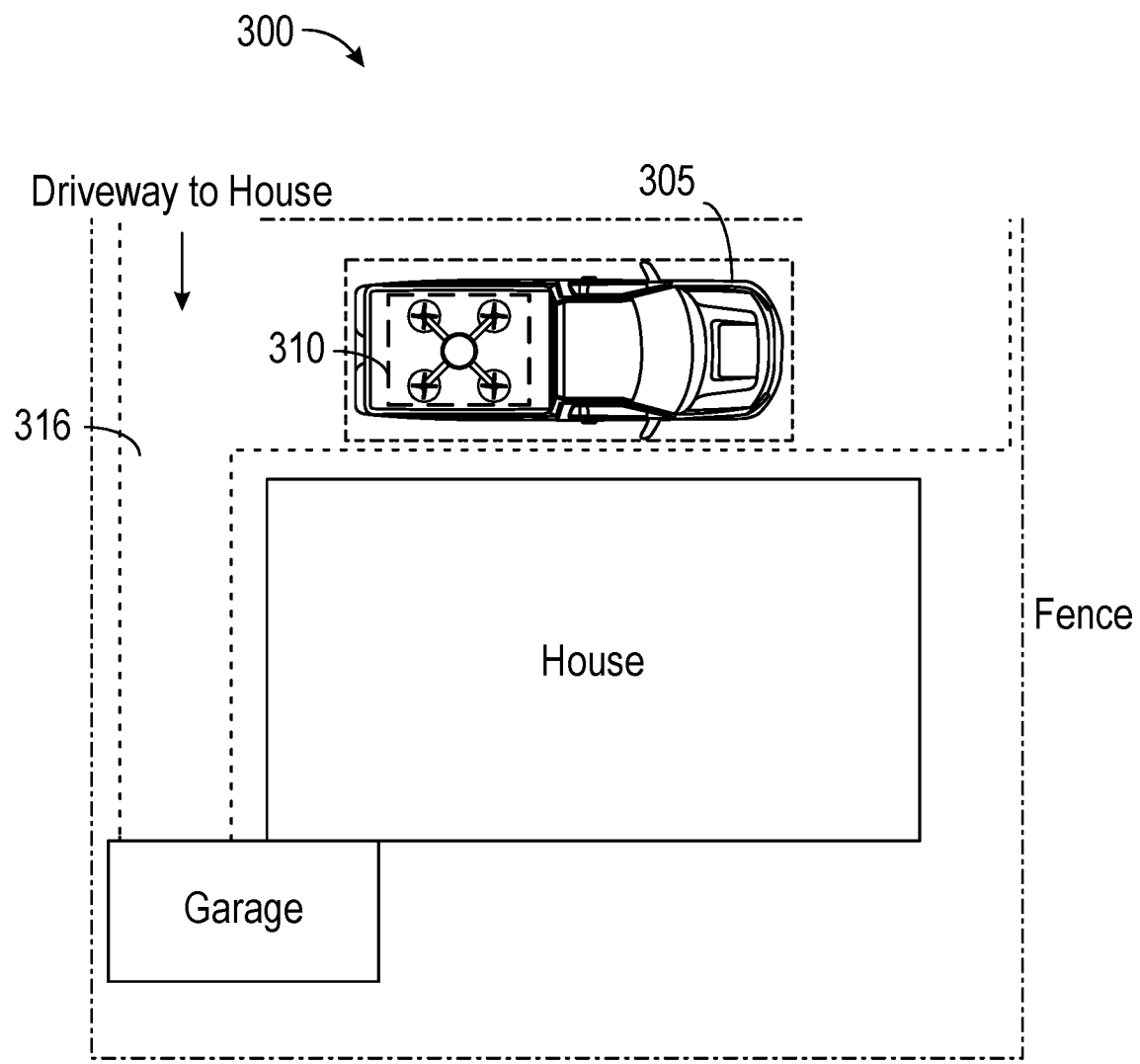
FIG. 3 illustrates an example implementation of a vehicle-and-drone-based security service in accordance with an embodiment of the disclosure.

FIG. 3 illustrates an example implementation of a vehicle-and-drone-based security service 300 in accordance with an embodiment of the disclosure. In some embodiments, as depicted in FIG. 3, at least one drone 310 may remain mounted to a vehicle 305 in order to charge the at least one drone 310. The vehicle 305 may be parked in a driveway 316. In some embodiments, although not depicted in FIG. 3, a battery charge level associated with the at least one drone 310 may be monitored as the at least one drone 310 travels along an assigned route. If the battery charge level is determined to be below a battery charge threshold, the at least one drone 310 may be instructed to return to the vehicle 305 for charging. Alternatively, the at least one drone 310 may be instructed to proceed to another charging station for charging, such as a house-based or a crawler charging pad. In other embodiments, prior to launching the at least one drone 310 to travel along an assigned route, a present battery charge level associated with the at least one drone 310 may be determined. A predicted battery consumption associated with the at least one drone 310 traveling along the route may be determined. The predicted battery consumption may be calculated based at least in part on an estimated time of flight, a communication distance from the at least one drone 310 to the vehicle 305, and usage and/or power consumption of the sensors of the at least one drone 310. A predicted battery charge level associated with the at least one drone 310 may be calculated, where the predicted battery charge level is the present battery charge level minus the predicted battery consumption. If the predicted battery charge level falls below a battery charge threshold, the at least one drone 310 may be retained at the vehicle 305 for charging prior to its launch. Alternatively, the at least one drone 310 may be instructed to proceed to another charging location for charging, such as a house-based or crawler charging pad.

In addition, if the vehicle 305 is an autonomous vehicle, the vehicle 305 may be configured to move, as necessary, to ensure that the at least one drone 310 remains in constant communication with the vehicle 305 as the at least one drone 310 travels along an assigned route. In some instances, if the vehicle 305 is a vehicle that can be charged, for example, an electric vehicle or a hybrid vehicle, the vehicle 305 may proceed to another charging location for charging, such as a house-based or crawler charging pad, if the vehicle 305 requires charging to continue to participate in the vehicle-and-drone-based security service 300. However, if the vehicle 305 is not fully autonomous, the vehicle 305 may be configured to remain stationary, and routes assigned to the at least one drone 310 may be limited to routes which permit the at least one drone 310 to remain in constant communication with the vehicle 305. However, if other participating vehicles are capable of receiving communications from and transmitting communications to the at least one drone 310, the at least one drone 310 may be assigned to a route where the at least one drone 310 may remain in communication with the vehicle 305, even if the communication may not be direct and may be routed through other participating vehicles. In such an embodiment, if charging of the at least one drone 310 is necessary, the at least one drone 310 may be directed to another participating vehicle for charging.

In some embodiments, in addition to assigning a route to the at least one drone 310, the vehicle-and-drone-based security service 300 may also assign a frequency associated with the route and a residency time associated with each area of interest. The assigned frequency and the residency times may be communicated to the at least one drone 310. The assigned frequency may refer to how often the at least one drone 310 will travel along the route. The residency time associated with each area of interest may refer to how long the at least one drone 310 will monitor the area of interest before proceeding to the next destination. For example, a higher designated tier of protection may be associated with higher frequencies, increased residency times, and/or increased utilization of sensor capabilities of the at least one drone 310 to increase threat detection capabilities. In some embodiments, the assigned frequency and the residency times may be configured to be irregular, in order to provide unpredictable coverage of the areas of interest.

In some embodiments, the vehicle 305 may function as a primary hub for providing instructions associated with the vehicle-and-drone-based security service 300 to the at least one drone 310. For example, instructions associated with the at least one drone's 310 routes, charging plans, and monitoring plans may be transmitted to the at least one drone 310 from the vehicle. The vehicle 305 may be configured to provide the at least one drone 310 with real-time commands regarding route directions, sensor settings, monitoring behaviors, altitudes, threat detection commands, and other operations. The vehicle 305 may generate the real-time commands at the vehicle 305, or the vehicle 305 may receive the real-time commands from a cloud database that is communicatively coupled to the vehicle 305. In some embodiments, the at least one drone 310 may be configured to detect a security threat based on local processing of the images and/or video feed obtained by the at least one drone 310. In some instances, security threat detection may be performed at the at least one drone 310 when the sensors of the at least one drone 310 are proximate enough to the security threat to directly detect the security threat. In other embodiments, the images and/or video feed obtained by the at least one drone 310 may be transmitted back to the vehicle 305, and image processing and security threat detection processes may take place at the vehicle 305 and/or a cloud database communicatively coupled to the vehicle 305 using vehicle-to-infrastructure (V2I) communication.

Figure 4:
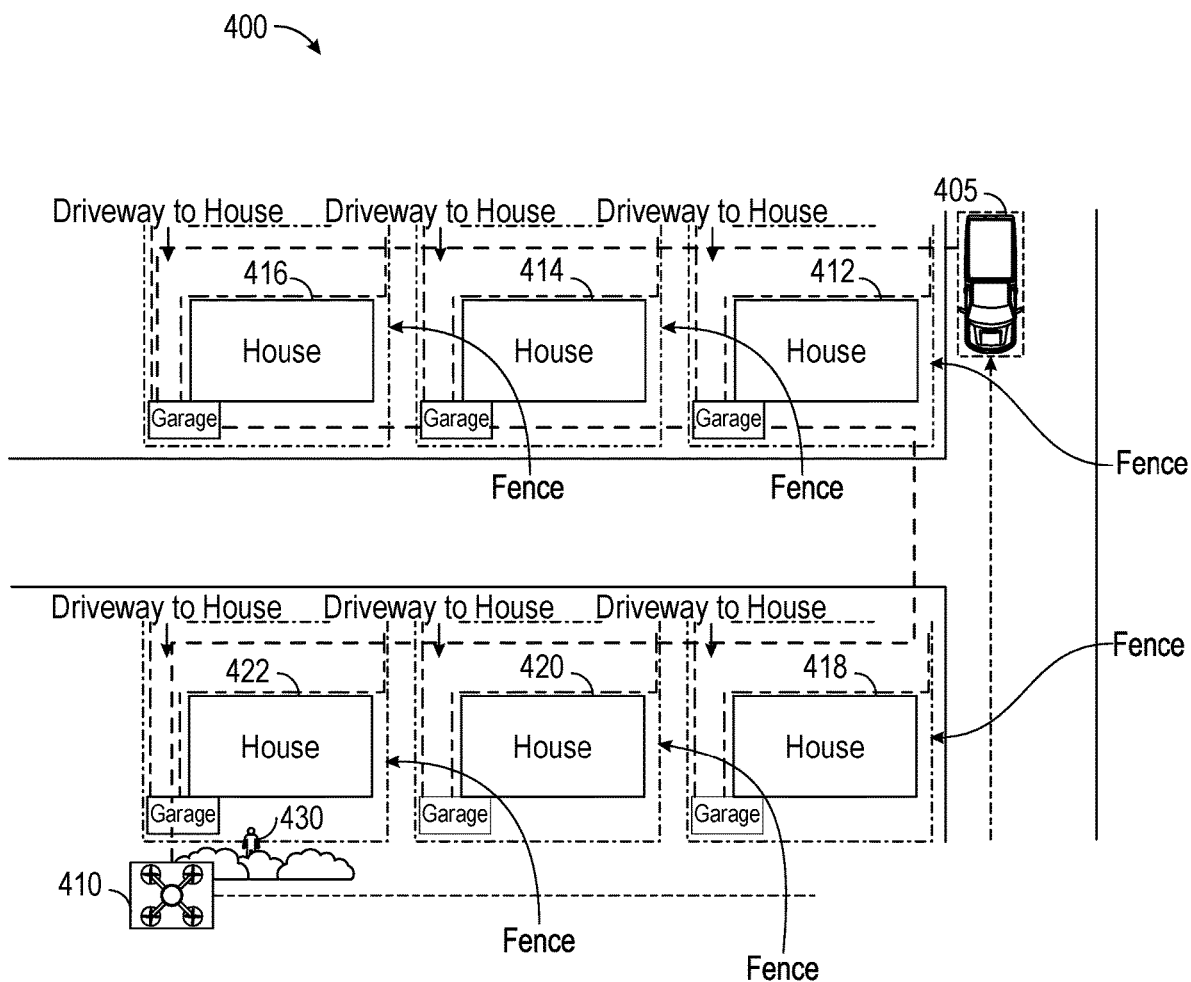
FIG. 4 illustrates an example implementation of a vehicle-and drone-based security service in accordance with an embodiment of the disclosure.

FIG. 4 illustrates an example implementation of a vehicle-and-drone-based security service 400 in accordance with an embodiment of the disclosure. In some embodiments, the vehicle-and-drone-based security service 400 may be applied to a neighborhood and/or designated patrol area, instead of a single property. For example, as depicted in FIG. 4, the designated patrol area may involve six properties. Three houses may be located on one side of a street, and three houses may be located on the other side of the street. A vehicle 405 may be located next to a first house 412. At least one drone 410 associated with the vehicle 405 may be assigned to monitor areas of interest at all six houses. As an example, the at least one drone 410 may have been assigned to travel from the vehicle 405, along the rear sides of the first house 412, a second house 414, and a third house 416, towards the front side of the third house 416, along the front sides of the third house 416, the second house 414, and the first house 412, cross the street towards a front side of a fourth house 418, along the front sides of the fourth house 418, a fifth house 420, and a sixth house 422, and then towards a rear side of the sixth house 422. Although not depicted in FIG. 4, the at least one drone 410 may be further configured to travel along the rear sides of the sixth house 422, the fifth house 420, and the fourth house 418, and then return to the vehicle 405.

In some embodiments, the vehicle 405 may verify that the at least one drone 410 has sufficient battery power to complete the route before launching the at least one drone 410. Prior to launch, the vehicle 405 may further verify that the at least one drone 410 is capable of remaining in constant communication with the vehicle 405 as it travels along the route. The at least one drone 410 is then launched from the vehicle 405 and may begin to travel along the route. However, as depicted in FIG. 4, the at least one drone 410 may identify a potential security threat 430 at a rear side of the sixth house 422. The at least one drone 410 may transmit images and/or video feed obtained by the at least one drone 410 to the vehicle 405, and the at least one drone 410 may notify the vehicle 405 of the potential security threat 430 and provide location information associated with the potential security threat 430 and other applicable information.

Figure 5:
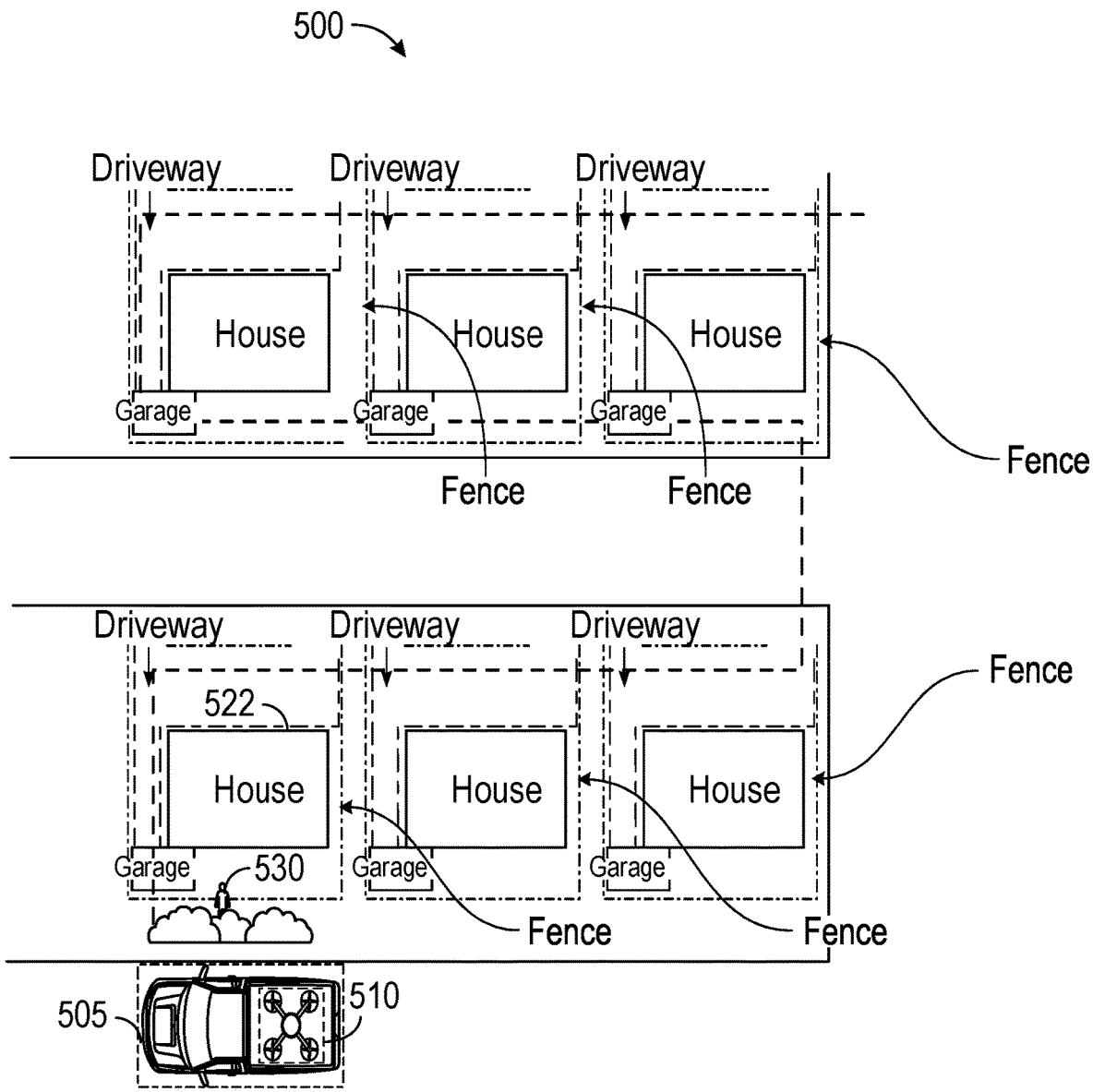
FIG. 5 illustrates an example implementation of a vehicle-and-drone-based security service in accordance with an embodiment of the disclosure.

FIG. 5 illustrates an example implementation of a vehicle-and-drone-based security service 500 in accordance with an embodiment of the disclosure. After at least one drone 510 has detected a potential security threat 530, the at least one drone 510 may transmit images and/or video feed obtained by the at least one drone 510 to a vehicle 505, and the at least one drone 510 may notify the vehicle 505 of the potential security threat 530 and provide location information associated with the potential security threat 530 and other applicable information. Image processing and security threat detection may take place at the at least one drone 510, at the vehicle 505, or at a cloud database communicatively coupled to the vehicle 505. If the potential security threat 530 is identified and the vehicle 505 is a fully autonomous vehicle, the vehicle 505 may be configured to move towards the security threat 530. For example, as depicted in FIG. 5, the vehicle 505 may be configured to travel along streets until the vehicle 505 has reached a street that is proximate to the rear side of a sixth house 522.

In some embodiments, if the detection of the security threat 530 is performed at the vehicle 505, the at least one drone 510 may record images and/or video feeds within a field of view of the at least one drone 510 and then transmit the images and/or video feed obtained by the at least one drone 510 to the vehicle 505 via drone-to-vehicle (D2V) communication and/or vehicle-to-vehicle (V2V) communication. Other applicable information, for example, location information associated with the security threat 530, may also be transmitted. The vehicle 505 may then be able to determine a location and/or a trajectory associated with the security threat 530. In some embodiments, the vehicle 505 and/or the at least one drone 510 may be configured to follow the security threat 530 in order to prevent the security threat 530 from leaving the area. In some instances, identifying information associated with the security threat 530 may be recorded by the at least one drone 510 and/or the vehicle 505. For example, the at least one drone 510 may obtain images and/or video feed that includes information such as a license plate number, facial features, apparel, the presence of weapons, and/or other identifying information. The vehicle 505 may also use its sensors to obtain similar types of identifying information.

In some embodiments, when the vehicle 505 has reached a location proximate to the security threat 530, the vehicle 505 may be configured to use thermal imaging and/or other sensor capabilities in order to more accurately identify the security threat 530. The vehicle 505 may be further configured to provide a warning to the security threat 530. The vehicle 505 may be additionally configured to transmit notifications associated with the security threat 530 to property owners, vehicle owners, or any other appropriate recipient that is participating in the vehicle-and-drone-based security service 500. In certain instances, the vehicle 505 may be configured to communicate with local authorities based on the nature of the security threat 530.

In some embodiments, the vehicle-and-drone-based security service 500 may be configured to generate a map of all the security threats that have been detected by various participating vehicles and drones. The map may depict location information associated with each threat, the nature of each threat, and a timing of each threat. In some embodiments, the vehicle-and-drone-based security service 500 may be configured to generate a map showing routes taken by each drone and each vehicle, residency times associated with each area of interest, and frequencies associated with routes and areas of interest. In some embodiments, if a patrol area involves multiple participating vehicles and/or multiple drones, the use of each vehicle and/or drone may be staggered to decrease overall power consumption while ensuring that there are no gaps in monitoring. The vehicle-and-drone-based security system 500 may determine the staggering of each vehicle based on a variety of factors, which may include the locations of participating properties, typical schedules associated with each vehicle, whether a vehicle is presently being charged, whether a vehicle is electric or gasoline-powered, whether a vehicle owner has designated a limited amount of power for use by the vehicle-and-drone-based security service 500, whether available crawler charging pads are located within the patrol area, and whether flying time associated with each drone is equalized across the various drones.

Figure 6:
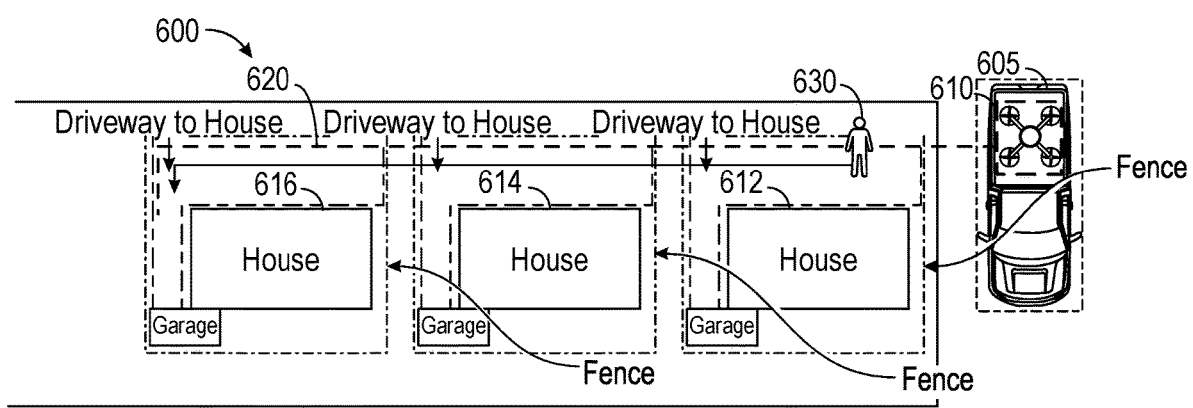
FIG. 6 illustrates an example implementation of a vehicle-and-drone-based security service in accordance with an embodiment of the disclosure.

FIG. 6 illustrates an example implementation of a vehicle-and-drone-based security service 600 in accordance with an embodiment of the disclosure. In some embodiments, a vehicle 605 may detect a potential security threat 630 at a front side of a first house 612 while the vehicle 605 is located next to the first house 612. The security threat 630 may then attempt to leave the area by traveling on a route 620 along the front sides of the first house 612, a second house 614, and a third house 616. The vehicle 605 may then launch at least one drone 610 to pursue the security threat 630 as the security threat 630 travels on the route 620 along the front sides of the first house 612, the second house 614, and the third house 616. The at least one drone 610 may be deployed for a variety of reasons. For example, the vehicle 605 may not be fully autonomous and therefore may not be able to pursue the security threat 630, the security threat 630 may not be proximate to a vehicle-accessible location, or using the at least one drone 610 to pursue the security threat 630 may be logistically preferable.

Figure 7:
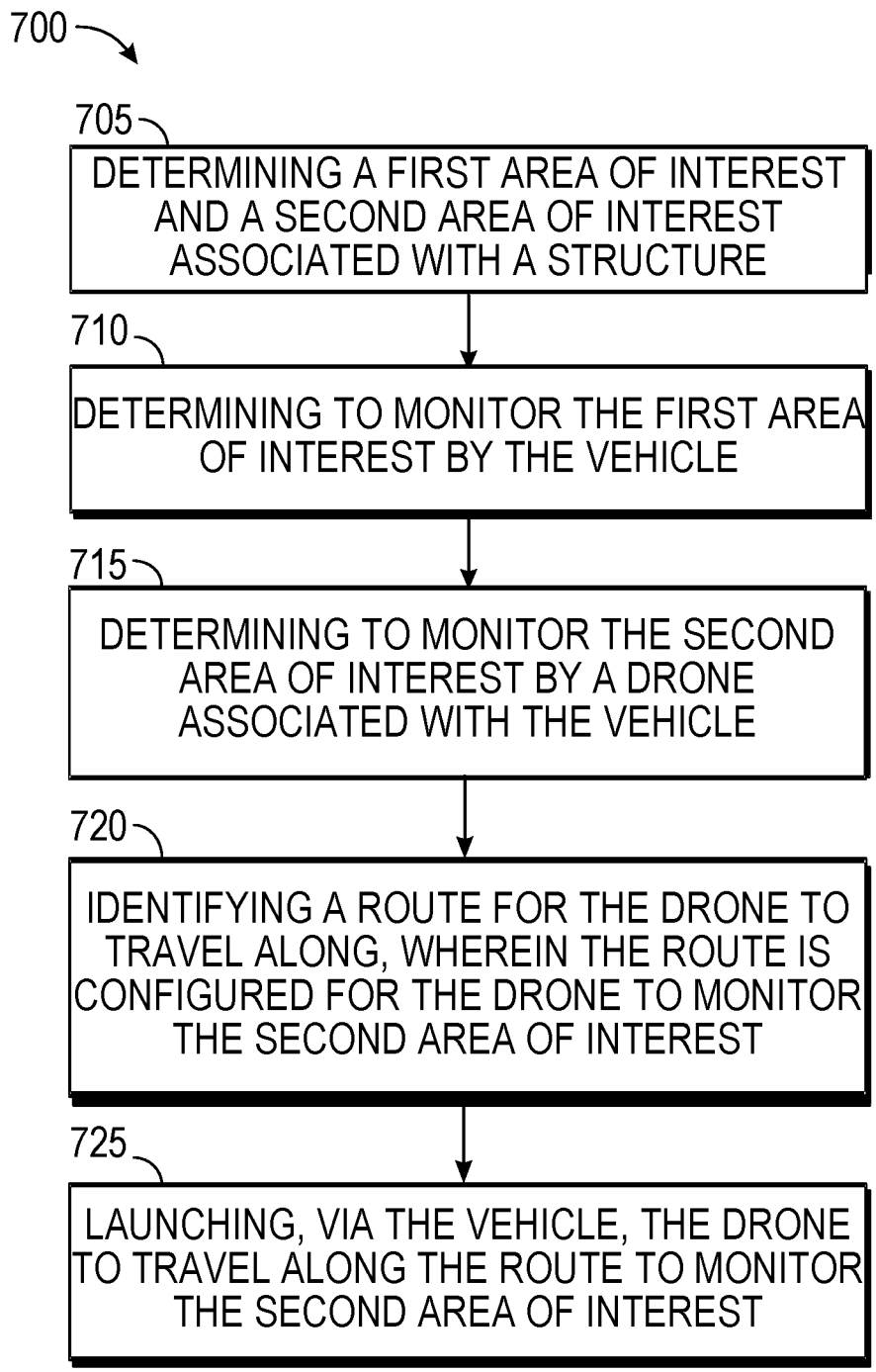
FIG. 7 depicts a flow chart of an example method for providing a vehicle-and-drone-based security service in accordance with the disclosure.

FIG. 7 shows a flow chart 700 of an example method of utilizing a vehicle-and-drone-based security service in accordance with the disclosure. The flow chart 700 illustrates a sequence of operations that can be implemented in hardware, software, or a combination thereof. In the context of software, the operations represent computer-executable instructions stored on one or more non-transitory computer-readable media such as a memory provided in the vehicle 105, that, when executed by one or more processors, such as a processor provided in the vehicle 105, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flow chart 700 may be carried out at the vehicle 105 either independently or in cooperation with other devices such as, for example, cloud elements (such as, for example, a computer and/or cloud storage.

At block 705, a first area of interest and a second area of interest associated with a structure may be determined.

At block 710, the first area of interest may be determined to be monitored by the vehicle. In some instances, the vehicle may be an autonomous vehicle, and the vehicle may be configured to move in order to ensure communication with the drone.

At block 715, the second area of interest may be determined to be monitored by a drone associated with the vehicle. In some instances, the drone may be configured to record a video feed associated with a field of view of the drone. The video feed may be transmitted to the vehicle for processing. In some instances, a security threat may be detected in the video feed by the vehicle. In such an instance, the drone may be instructed to follow the security threat.

At block 720, a route may be identified for the drone to travel along. The route may be configured for the drone to monitor the second area of interest. In some instances, a third area of interest associated with the structure may be determined. It may be further determined that a first priority level associated with the third area of interest may exceed a second priority level associated with the second area of interest. In such an instance, the drone may be instructed to travel to the third area of interest from the second area of interest, and a sensor setting associated with the drone may be changed.

At block 725, the drone may be launched via the vehicle to travel along the route to monitor the second area of interest. In some instances, a battery charge level associated with the drone may be monitored. If the battery charge level is determined to be below a battery charge threshold, the drone may be instructed to return to the vehicle for charging. In other instances, prior to launching the drone, a present battery charge level associated with the drone may be determined. A predicted battery consumption associated with the drone traveling along the route may additionally be determined. A predicted battery charge level associated with the drone may be calculated, where the predicted battery charge level comprises the present battery charge level minus the predicted battery consumption. If the predicted battery charge level is determined to be below a battery charge threshold, the drone may be charged prior to its launch.

Figure 8:
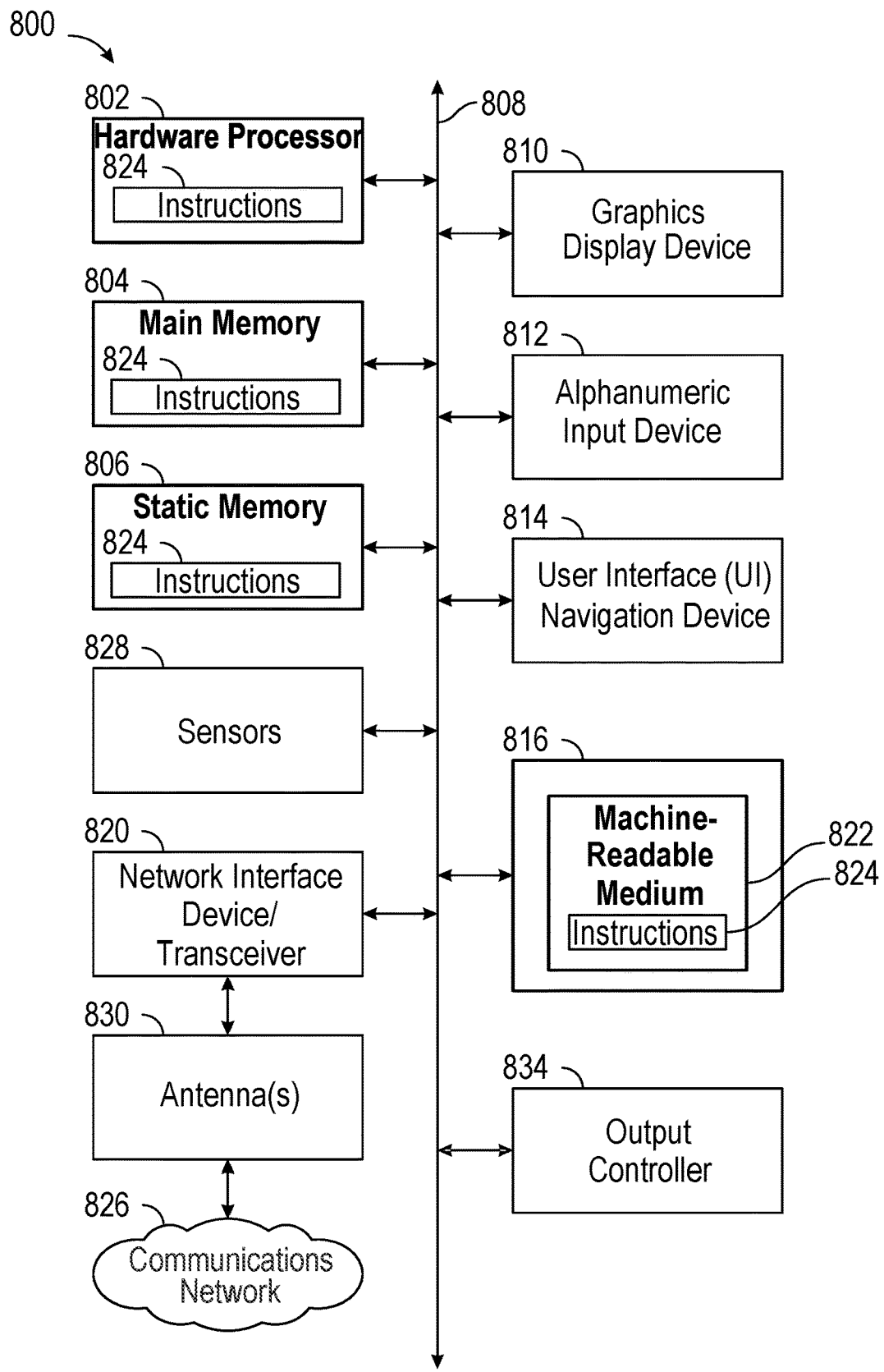
FIG. 8 depicts a block diagram of an example machine upon which any of one or more techniques (e.g., methods) may be performed, in accordance with an embodiment of the disclosure.

FIG. 8 depicts a block diagram of an example machine 800 upon which any of one or more techniques (e.g., methods) may be performed, in accordance with one or more example embodiments of the present disclosure. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. In some embodiments, the machine 800 may be the vehicle 105, as depicted in FIG. 1. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a graphics display device 810, an alphanumeric input device 812 (e.g., a keyboard), and a user interface (UI) navigation device 814. In an example, the graphics display device 810, the alphanumeric input device 812, and the UI navigation device 814 may be a touch screen display. The machine 800 may additionally include a storage device (i.e., drive unit) 816, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee®, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey the information that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   determining a first area of interest and a second area of interest associated with a structure;
   determining to monitor the first area of interest by a vehicle;
   determining to monitor the second area of interest by a drone associated with the vehicle;
   identifying a route for the drone to travel along, wherein the route is configured for the drone to monitor the second area of interest;
   launching, via the vehicle, the drone to travel along the route to monitor the second area of interest;
   determining, prior to launching the drone, a present battery charge level associated with the drone;
   determining a predicted battery consumption associated with the drone traveling along the route;
   calculating a predicted battery charge level associated with the drone, wherein the predicted battery charge level comprises the present battery charge level minus the predicted battery consumption;
   determining that the predicted battery charge level is below a battery charge threshold; and
   charging the drone prior to launching the drone.

2. The method of claim 1, wherein the vehicle is an autonomous vehicle, and wherein the vehicle is configured to move to ensure communication with the drone.

3. The method of claim 1, wherein the drone is configured to record a video feed associated with a field of view of the drone, and wherein the video feed is transmitted to the vehicle for processing.

4. The method of claim 3, wherein a security threat in the video feed is (Original) detected by the vehicle, and wherein the drone is instructed to follow the security threat.

5. The method of claim 1, further comprising:
   monitoring a battery charge level associated with the drone;
   determining that the battery charge level is below a battery charge threshold; and
   instructing the drone to return to the vehicle for charging.

6. The method of claim 1, further comprising:
   determining a third area of interest associated with the structure;
   determining that a first priority level associated with the third area of interest exceeds a second priority level associated with the second area of interest;
   instructing the drone to travel to the third area of interest from the second area of interest; and
   changing a sensor setting associated with the drone.

7. A device, comprising:
   at least one memory device that stores computer-executable instructions; and
   at least one processor configured to access the at least one memory device, wherein the at least one processor is configured to execute the computer-executable instructions to:
   determine a first area of interest and a second area of interest associated with a structure;
   determine to monitor the first area of interest by a vehicle;
   determine to monitor the second area of interest by a drone associated with the vehicle;
   identify a route for the drone to travel along, wherein the route is configured for the drone to monitor the second area of interest;
   launch, via the vehicle, the drone to travel along the route to monitor the second area of interest;
   determine a third area of interest associated with the structure;
   determine that a first priority level associated with the third area of interest exceeds a second priority level associated with the second area of interest;
   instruct the drone to travel to the third area of interest from the second area of interest; and
   change a sensor setting associated with the drone.

8. The device of claim 7, wherein the vehicle is an autonomous vehicle, and wherein the vehicle is configured to move to ensure communication with the drone.

9. The device of claim 7, wherein the drone is configured to record a video feed associated with a field of view of the drone, and wherein the video feed is transmitted to the vehicle for processing.

10. The device of claim 9, wherein a security threat in the video feed is detected by the vehicle, and wherein the drone is instructed to follow the security threat.

11. The device of claim 7, wherein the at least one processor is further configured to execute the computer-executable instructions to:
monitor a battery charge level associated with the drone;
determine that the battery charge level is below a battery charge threshold; and
instruct the drone to return to the vehicle for charging.

12. The device of claim 7, wherein the at least one processor is further configured to execute the computer-executable instructions to:
determine, prior to launching the drone, a present battery charge level associated with the drone;
determine a predicted battery consumption associated with the drone traveling along the route;
calculate a predicted battery charge level associated with the drone, wherein the predicted battery charge level comprises the present battery charge level minus the predicted battery consumption;
determine that the predicted battery charge level is below a battery charge threshold; and
charge the drone prior to launching the drone.

13. A non-transitory computer-readable medium storing computer-executable instructions which, when executed by a processor, cause the processor to perform operations comprising:
determining a first area of interest and a second area of interest associated with a structure;
determining to monitor the first area of interest by a vehicle;
determining to monitor the second area of interest by a drone associated with the vehicle;
identifying a route for the drone to travel along, wherein the route is configured for the drone to monitor the second area of interest;
launching, via the vehicle, the drone to travel along the route to monitor the second area of interest;
determining, prior to launching the drone, a present battery charge level associated with the drone;
determining a predicted battery consumption associated with the drone traveling along the route;
calculating a predicted battery charge level associated with the drone, wherein the predicted battery charge level comprises the present battery charge level minus the predicted battery consumption;
determining that the predicted battery charge level is below a battery charge threshold; and
charging the drone prior to launching the drone.

14. The non-transitory computer-readable medium of claim 13, wherein the vehicle is an autonomous vehicle, and wherein the vehicle is configured to move to ensure communication with the drone.

15. The non-transitory computer-readable medium of claim 13, wherein the drone is configured to record a video feed associated with a field of view of the drone, and wherein the video feed is transmitted to the vehicle for processing.

16. The non-transitory computer-readable medium of claim 15, wherein a security threat in the video feed is detected by the vehicle, and wherein the drone is instructed to follow the security threat.

17. The non-transitory computer-readable medium of claim 13, wherein the operations further comprise:
determining a third area of interest associated with the structure;
determining that a first priority level associated with the third area of interest exceeds a second priority level associated with the second area of interest;
instructing the drone to travel to the third area of interest from the second area of interest; and
changing a sensor setting associated with the drone.

* * * * *